United States Patent [19]

Horiie et al.

[11] 3,912,793

[45] Oct. 14, 1975

[54] BLOCK COPOLYMERS AND PROCESS FOR THE PREPARATION THEREOF

[75] Inventors: Shigeki Horiie, Yokohama; Shin-ichiro Asai, Tokyo; Yoshihisa Moriya, Tokyo; Chiaki Saito, Tokyo, all of Japan

[73] Assignee: Denki Kagaku Kogyo Kabushiki Kaisha, Tokyo, Japan

[22] Filed: Sept. 25, 1973

[21] Appl. No.: 400,608

[30] Foreign Application Priority Data

Sept. 29, 1972 Japan.............................. 47-97768

[52] U.S. Cl.............................. 260/880 B; 260/880
[51] Int. Cl.²........................................ C08L 9/06
[58] Field of Search......................... 260/879, 880 B

[56] References Cited
FOREIGN PATENTS OR APPLICATIONS
1,191,605  5/1970  United Kingdom................. 260/880
1,264,741  2/1972  United Kingdom................. 260/880

Primary Examiner—Paul R. Michl
Attorney, Agent, or Firm—Sughrue, Rothwell, Mion, Zinn & Macpeak

[57] ABSTRACT

Block copolymers of a conjugated diene and α-methyl-styrene are obtained by polymerizing α-methyl-styrene in the presence of a promotor at low temperature after completion of polymerization of a conjugated diene, adding styrene monomers in a certain amount at the time when the polymerization of α-methyl-styrene is advanced to the degree of the monomer equilibrium concentration or near, and substantially completing polymerization of the remaining α-methyl-styrene and styrene. These block copolymers have the structure with a polymeric chain composed of a central polymer block of conjugated diene units and a terminal tapered-copolymer block of α-methyl-styrene and styrene.

4 Claims, No Drawings

BLOCK COPOLYMERS AND PROCESS FOR THE PREPARATION THEREOF

BACKGROUND OF THE INVENTION

The present invention relates to a novel block copolymer composed of a central polymer block of the major proportion of conjugated diene units and terminal, tapered copolymer blocks of α-methyl-styrene and styrene units and a process for its preparation.

British Pat. No. 1,264,741 discloses block coplymers with polymeric chains containing alternately a random copolymer block of styrene and α-methyl-styrene and a polymer block of conjugated diene units. In case polymerization of α-methyl-styrene with use of an organolithium compound as an initiator is effected at temperatures above normal temperature, there occurs a problem that because a monomer concentration in the polymerization equilibrium state is remarkably high, it is impossible to complete the polymerization of α-methyl-styrene even though it is continued for a long time. The α-methyl-styrene monomer concentration in the polymerization equilibrium state (referred to merely as "α-methyl-styrene monomer equilibrium concentration" hereinafter) varies depending on the polymerization conditions, particularly the polymerization temperature, and the lower the temperature, the more the equilibrium concentration is lowered. For raising a polymerization rate the polymerization of α-methyl-styrene has been effected at a low temperature in general. In the preparation of block copolymers containing such α-methyl-styrene, even though polymerization is continued at low temperatures, for example, below −10°C to the degree of the α-methyl-styrene monomer equilibrium concentration, monomers corresponding to the equilibrium concentration remain as an inevitable consequence in the polymerization mixture. Accordingly, when block copolymers are removed from the polymerization mixture by stripping a solvent, said monomers incorporated with the solvent make its purification difficult. Further, it is difficult to remove monomer residues in block copolymers so that they cause foaming and also emit an offensive odor during subsequent processing. Moreover, a low temperature polymerization not only is economically inadvisable because of requiring any apparatus for cooling, but also has disadvantage that a polymerization rate is lowered.

SUMMARY OF THE INVENTION

An object of the invention is to provide a block copolymer of a conjugated diene and α-methyl-styrene, free of a α-methylstyrene monomer residue.

Another object of the invention is to provide a process for preparing a block copolymer with high yield at a relatively high temperature as compared with the conventional methods.

The characteristics of a block copolymer of the invention lie in a configuration with a polymeric chain composed of a central polymer block of the major proportion of conjugated diene units and multiple terminal tapered-copolymer blocks of α-methyl-styrene and styrene. The block copolymer having such a configuration is obtained by polymerizing monomers mainly containing a conjugated diene in the presence of a polyfunctional organolithium compound as an initiator, substantially completing the polymerization, thereafter adding α-methylstyrene, polymerizing α-methyl-styrene in the presence of a polymerization promotor at temperatures of −10° to 30°C, then adding continuously or discontinuously styrene in the amount of 20 to 300 % by weight in respect of the total amount of α-methyl-styrene remaining in the polymerization mixture at the time when the polymerization of α-methyl-styrene is advanced to the degree of the monomer equilibrium concentration or near, and substantially completing the polymerization of the remaining α-methyl-styrene and styrene.

DETAILED DESCRIPTION OF THE INVENTION

The block copolymer according to the invention has such configuration that a polymeric chain has branches amounting to the number of lithium atoms, extending from ends of initiator radicals present in the center. A central block of the polymeric chain is composed of a block of the major proportion of conjugated diene units and linked with blocks of α-methyl-styrene polymer or copolymer of the major proportion of α-methylstyrene with styrene. The latter block has such a taperedterminal configuration that the polymeric chain is increased in polymeric proportion of styrene units and decreased in polymeric proportion of α-methyl-styrene at it gets nearer to terminals which are substantially dominated by styrene units.

Styrene monomers to be added in accordance with the invention are within the range of 20 to 300 weight %, preferably 30 to 100 weight % in respect of the total amount of α-methylstyrene remaining in the polymerization mixture. When the amount of styrene is less than 20 weight %, it is impossible to polymerize completely the remaining α-methyl-styrene. It is unnecessary to use the amount of more than 300 weight %. Styrene may be added little by little continuously or may be added in several portions as the polymerization of α-methylstyrene proceeds.

The polymerization of α-methyl-styrene may be effected at temperatures of −10° to 30°C, preferably 0° to 20°C. Temperatures of less than −10°C lead to lowering of a polymerization rate. On the other hand, when the polymerization is effected at temperatures above 30°C, styrene must be added in large quantities because the monomer equilibrium concentration becomes high. In addition to this there is disadvantage that chain transfer often occurs.

During polymerization monomer concentrations are measured by sampling a polymerization solution and thereby an addition time and amount of styrene monomers are determined.

An amount of α-methyl-styrene is within the range of 15 to 60 weight % in respect of the eventual block copolymer. With an amount of less than 15 weight %, no block copolymer has an improved thermal resistance. On the other hand, it is difficult to completely polymerize α-methyl-styrene monomers in an amount of more than 60 weight % without leaving unreacted monomers in the polymerization mixture.

A block of the major proportion of conjugated diene units composing the center of the block copolymer according to the invention is polymers of butadiene or isoprene or copolymers of same and a minor proportion of other copolymerizable monomers. The monomers are sufficiently dehydrated and purified for use. Preferably, an amount of the conjugated diene is within the range of 15 to 80 weight % in respect of the eventual block copolymer.

An initiator for polymerization is an organolithium compound having two or more reactive lithium atoms, for example, dilithio-benzene, dilithio-naphthalene, and butadiene oligomer dilithium. Initiators insoluble in a solvent for polymerization are made soluble by adding monomers to them.

As a solvent for polymerization an aromatic, aliphatic or alicyclic, non-polar solvent is used.

In the polymerization of α-methyl-styrene ethers, amines and amides are used in small quantities as a promotor. Examples of these promotors include hexamethylene phosphamide, hexamethylenetetramine, ethyleneglycoldimethylether, and dimethoxyethanetetrahydrofurane. Since the promotors raise a glass transition temperature of the conjugated diene block, it is desirable to effect the polymerization of monomers mainly containing the conjugated diene in a non-polar solvent free of polar substances such as the above mentioned promotors and to add the promotors immediately before addition of α-methylstyrene.

According to the invention, block copolymers composed of a central polymer block of the major proportion of conjugated diene units and a terminal tapered-copolymer block of α-methylstyrene and styrene have an improved thermal resistance as compared with the conventional block copolymers composed of conjugated diene units and styrene units, and consequently are used as thermoplastic elastomers or resins with thermal resistance in the various fields. Also, the block copolymers are thermally stable under the temperature condition for molding so that no thermal decomposition arose in them.

According to the invention, furthermore, since a block copolymer solution does not practically contain monomers, the end block copolymer can be removed by subjecting the block copolymer solution to steam-stripping as it is.

The invention is illustrated by the following non-limitative example.

EXAMPLE 1

1 l of a purified and dehydrated benzene and 90 g of butadiene were charged into a 3l flask provided with a stirrer and added with 3.5 milli-mols of butadiene oligomer dilithium as an initiator, and polymerization was effected in a nitrogen gas atmosphere at 50°C for 2 hours. After completion of the polymerization of budadiene 2 ml of hexamethylenephosphamide were added and the reactor was colled to 5°C. 150g of α-methylstyrene were then added and polymerization was effected for one hour while measuring the α-methyl-styrene monomer concentration. After one hour, the polymerization reaction reached about equilibrium state, when the α-methyl-styrene concentration in the polymerization solution was 9.5% by weight. This shows that an unreacted α-methyl-styrene was remaining in the amount of about 106g. Next, while maintaining the temperature of the polymerization solution at 5°C, 60g of styrene were little by little continuously added over 2 hours. After addition of styrene, the concentration of α-methyl-styrene was measured, but it could not be detected. Herein, a method for detecting α-methyl-styrene includes pouring a sample into methanol and measuring gaschromatographically it.

A block copolymer was removed from the copolymer solution thus obtained by steam stripping, using a crum-former in a small scale. The conversion ratio was measured to be a yield of 99%. After drying at 50°C for 6 hours by a blower, a white block copolymer in form of powders was obtained which did not emit the α-methyl-styrene like odor at all.

The powdered block copolymer thus obtained was pelletized by a small-sized extruder with φ 20 mm and then moulded to a specimen of 2 mm in thickness and 8 mm in width. In the steps of pelletizing and moulding, no foaming arose in the block copolymer and the α-methyl-styrene like odor was not almost emitted.

Physical properties of the block copolymer were measured.

| | |
|---|---|
| Molecular weight : | 95,000 |
| Tensile strength : (according to the method of JIS K-6871) | 285 kg/cm$^2$ |
| Elongation (according to the method of JIS K-6871) | 6 % |
| Impact strength (according to the method of DIN 53453) | 16 kg cm/cm$^2$ |
| Vicat softening point (according to the method of JIS K-6870) | 108°C |

Control 1

A block copolymer with the structure of α-methyl-styrene polymer block/butadiene polymer block / α-methyl-styrene polymer block was prepared without addition of styrene.

1,55 l of benzene and 210g of α-methyl-styrene were charged into a 3 l flask provided with a stirrer and added with 2 ml of hexamethylenephosphamide and 4.5 millimols of n-butyl-lithium, and polymerization was effected in a nitrogen gas atmosphere at 3°C for one hours. 90g of butadiene were, then, introduced and the temperature was raised to 50°C. A further polymerization was effected for 4 hours. The temperature was lowered again to 3°C and 210g of α-methyl-styrene was added followed by polymerization for one hour. At this time the α-methyl-styrene concentration in the polymerization solution was 9.0 weight %. The concentration was no longer lowered below that even when a further polymerization was continued. A small amount of methanol was added into the polymerization solution to cease the polymerization reaction, and then the polymerization solution was subject to steam-stripping at 85°C, using a small-sized crum-former. The block copolymer thus obtained, even after drying at 60°C for 5 hours, emitted the odor peculiar to α-methyl-styrene, of which content was measured to be about 3 % by weight.

What we claim is:

1. A block copolymer having a polymeric chain consisting essentially of a central polymer block formed of homopolymer blocks of butadiene or isoprene or copolymer blocks of a major amount of butadiene or isoprene with a minor amount of copolymerizable monomer, homopolymer blocks of α-methyl-styrene attached to said central block and, attached to said homopolymer blocks of α-methyl-styrene, tapered copolymer blocks of styrene and α-methyl-styrene, the proportion of styrene units in said copolymer blocks increasing towards their ends distant from the α-methylstyrene homopolymer blocks, and terminal homopolymer blocks of styrene attached to said tapered copolymer blocks, said central polymer block and said α-methyl-styrene units being present in amounts of 15 to 80 wt.% and 15 to 60 wt.% respectively, based on the copolymer.

2. In a process for preparing a block copolymer mainly comprising a conjugated diene and α-methyl-styrene by first polymerizing monomers mainly containing a conjugated diene in the presence of a polyfunctional organolithium compound as an initiator, substantially completing the polymerization, thereafter adding α-methyl-styrene, polymerizing α-methyl-styrene in the presence of a polymerization promotor the improvement which comprises polymerizing the α-methyl-styrene at a temperature of −10° to 30°C, adding gradually styrene in the amount of 20 to 300 % by weight in respect of the total amount of α-methyl-styrene remaining in the polymerization mixture at the time when the polymerization of α-methyl-styrene is advanced to the degree of the monomer equilibrium concentration or near, and substantially completing polymerization of the remaining α-methyl-styrene and styrene.

3. A process of claim 2 wherein said promotor is selected a polar substance of ethers, amines and amides.

4. A process of claim 2 wherein the polymerization of the conjugated diene is effected in a non-polar solvent and the said promotor is added after completion of the polymerization of the conjugated diene.

* * * * *